US012760651B2

(12) United States Patent
Corsetti et al.

(10) Patent No.: US 12,760,651 B2
(45) Date of Patent: Oct. 13, 2026

(54) AIRFOIL ASSEMBLY WITH PLATFORM COOLING

(71) Applicant: GENERAL ELECTRIC COMPANY, Schenectady, NY (US)

(72) Inventors: Brian Kenneth Corsetti, Reading, MA (US); Zachary Daniel Webster, Cincinnati, OH (US); Kirk Douglas Gallier, Liberty Township, OH (US); Daniel Endecott Osgood, Loveland, OH (US); Susan Emily Schulz, Colerain Township, OH (US)

(73) Assignee: GENERAL ELECTRIC COMPANY, Evendale, OH (US)

( * ) Notice: Subject to any disclaimer, the term of this patent is extended or adjusted under 35 U.S.C. 154(b) by 0 days.

(21) Appl. No.: 18/514,499

(22) Filed: Nov. 20, 2023

(65) Prior Publication Data

US 2025/0163813 A1 May 22, 2025

(51) Int. Cl.
*F01D 5/18* (2006.01)

(52) U.S. Cl.
CPC ............. *F01D 5/188* (2013.01); *F01D 5/187* (2013.01); *F05D 2240/81* (2013.01); *F05D 2260/201* (2013.01)

(58) Field of Classification Search
CPC .......... F01D 5/186; F01D 5/187; F01D 9/065; F05D 2240/81; F05D 2260/20; F05D 2260/201; F05D 2260/202
See application file for complete search history.

(56) References Cited

U.S. PATENT DOCUMENTS

| | | | | |
|---|---|---|---|---|
| 6,132,173 | A | 10/2000 | Tomita et al. | |
| 6,196,799 | B1 * | 3/2001 | Fukue | F01D 5/187 416/97 R |
| 6,402,471 | B1 * | 6/2002 | Demers | F01D 11/04 416/193 A |
| 7,416,391 | B2 | 8/2008 | Veltre et al. | |
| 7,513,738 | B2 | 4/2009 | Itzel et al. | |
| 8,356,978 | B2 | 1/2013 | Beattie et al. | |
| 8,814,518 | B2 | 8/2014 | Harris, Jr. et al. | |
| 10,100,647 | B2 | 10/2018 | Molter et al. | |
| 10,323,523 | B2 | 6/2019 | Bahador | |
| 11,225,873 | B2 | 1/2022 | Koenig et al. | |
| 11,236,625 | B2 | 2/2022 | Beyer et al. | |
| 11,486,259 | B1 | 11/2022 | Osgood et al. | |
| 2006/0269409 | A1 | 11/2006 | Torii et al. | |
| 2012/0082567 | A1 * | 4/2012 | Tibbott | F01D 5/081 416/97 R |
| 2014/0072400 | A1 | 3/2014 | Dillard | |
| 2014/0154063 | A1 | 6/2014 | Zhang | |

(Continued)

*Primary Examiner* — Courtney D Heinle
(74) *Attorney, Agent, or Firm* — Hanley, Flight & Zimmerman, LLC

(57) ABSTRACT

An airfoil assembly for a turbine engine, the airfoil assembly including a platform having an upper surface and a lower surface that are spaced from one another in a radial direction; a leading edge and trailing edge that are spaced from one another in an axial direction; and a first slash face and a second slash face that are spaced from one another in a circumferential direction. An airfoil can extend in from the platform in a radial direction. A platform chamber can be defined at least partially between the upper surface and the lower surface. The platform can include an impingement channel.

18 Claims, 13 Drawing Sheets

(56) References Cited

U.S. PATENT DOCUMENTS

| | | | | |
|---|---|---|---|---|
| 2014/0338364 | A1 | 11/2014 | Johns et al. | |
| 2015/0152735 | A1 | 6/2015 | Molter et al. | |
| 2016/0186664 | A1 | 6/2016 | Kirtley | |
| 2017/0145923 | A1 * | 5/2017 | Spangler | F01D 5/18 |
| 2017/0198588 | A1 * | 7/2017 | Spangler | F01D 5/186 |
| 2024/0026795 | A1 * | 1/2024 | Hafner | F01D 9/041 |

* cited by examiner

AIRFOIL ASSEMBLY WITH PLATFORM COOLING

TECHNICAL FIELD

This disclosure generally relates to an apparatus for cooling a component of a turbine engine and more specifically to cooling an airfoil and platform.

BACKGROUND

Turbine engines, and particularly gas or combustion turbine engines, include rotary engines that extract energy from a flow of combusted gases passing through the engine. The combusted gases flow over a multitude of airfoils including stationary vanes and rotating turbine blades.

Gas turbine engines for aircraft can be designed to operate at high temperatures to maximize engine efficiency. Accordingly, cooling of certain engine components can be beneficial.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
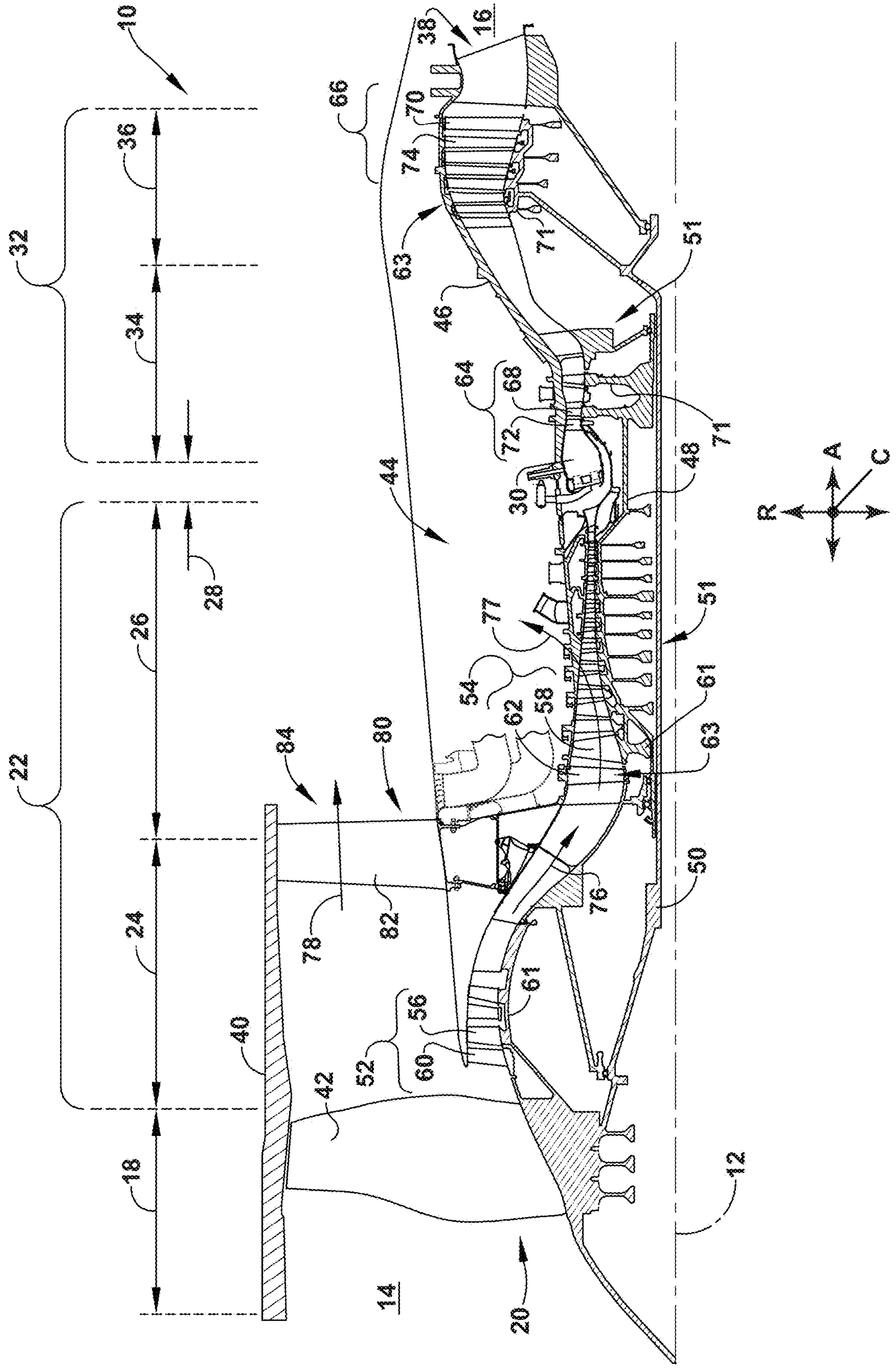
FIG. 1 is a schematic partial cross-sectional diagram of a gas turbine engine for an aircraft.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

Aspects of the disclosure generally relate to an apparatus for cooling an airfoil assembly, and impingement channels located in a platform of a turbine airfoil assembly. For purposes of illustration, the present disclosure will be described with respect to a blade assembly and cored platform. It will be understood, however, that aspects of the disclosure described herein are not so limited and may have general applicability within other engine components including vane assemblies and/or shroud assemblies. For example, a similar approach could be used for a nozzle. Therefore, the term "platform" as used herein can include, among other things, platforms for blade assemblies and nozzle bands for vane assemblies.

The word "exemplary" may be used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

As may be used herein, the terms "first," "second," and "third" can be used interchangeably to distinguish one component from another and are not intended to signify location or importance of the individual components.

The singular forms "a", "an", and "the" include plural references unless the context clearly dictates otherwise. Furthermore, as used herein, the term "set" or a "set" of elements can be any number of elements, including only one.

As used herein, the term "upstream" refers to a direction that is opposite the fluid flow direction, and the term "downstream" refers to a direction that is in the same direction as the fluid flow. With regard to a gas turbine engine, "forward" refers to a position closer to an engine inlet and "aft" refers to a position closer to an engine nozzle or exhaust.

The term "fluid" may be a gas or a liquid, or multi-phase. The term "fluid communication" means that a fluid is capable of making the connection between the areas specified.

Additionally, as used herein, the terms "radial" or "radially" refer to a direction away from a common center. For example, in the overall context of a turbine engine, radial refers to a direction of a ray extending from a center longitudinal axis of the engine in a plane orthogonal to the center longitudinal axis of the engine.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein.

Connection references (e.g., attached, coupled, connected, and joined) are to be construed broadly and can include intermediate structural elements between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

FIG. 1 is a schematic cross-sectional diagram of a gas turbine engine 10 for an aircraft. The engine 10 has a generally longitudinally extending axis or engine centerline 12 extending forward 14 to aft 16. The engine 10 includes, in downstream serial flow relationship, a fan section 18 including a fan 20, a compressor section 22 including a booster or low pressure (LP) compressor 24, a high pressure (HP) compressor 26, a combustion section 28 including a combustor 30, a turbine section 32 including a HP turbine 34 and a LP turbine 36, and an exhaust section 38. A radial direction R, a circumferential direction C, and an axial direction A may be defined relative to the engine centerline 12.

The fan section 18 includes a fan casing 40 surrounding the fan 20. The fan 20 includes a plurality of fan blades 42 disposed radially about the engine centerline 12. The HP compressor 26, the combustor 30, and the HP turbine 34 form a core 44 of the engine 10, which generates combustion gases. The core 44 is surrounded by a core casing 46, which can be coupled with the fan casing 40.

A HP shaft or spool 48 is disposed coaxially about the engine centerline 12 of the engine 10. The HP spool 48 drivingly connects the HP turbine 34 to the HP compressor 26. A LP shaft or spool 50 is disposed coaxially about the engine centerline 12 of the engine 10 within the larger diameter annular HP spool 48. The LP spool 50 drivingly connects the LP turbine 36 to the LP compressor 24 and fan 20. The spools 48, 50 are rotatable about the engine centerline 12 and couple to a plurality of rotatable elements, which can collectively define a rotor 51.

The LP compressor 24 and the HP compressor 26 respectively include a plurality of compressor stages 52, 54. A set of compressor blades 56, 58 rotate relative to a corresponding set of static compressor vanes 60, 62 (also called a nozzle) to compress or pressurize the stream of fluid passing through the stages 52, 54. In a single compressor stage 52, 54, multiple compressor blades 56, 58 can be provided in a ring. The compressor blades 56, 58 can extend radially outwardly relative to the engine centerline 12, from a blade platform to a blade tip. The corresponding static compressor vanes 60, 62 are positioned upstream of and adjacent to the rotating blades 56, 58. It is noted that the number of blades, vanes, and compressor stages shown in FIG. 1 were selected for illustrative purposes only, and that other numbers are possible.

The blades 56, 58 for a stage of the compressor 24, 26 can be mounted to a disk 61. The disk 61 is mounted to a corresponding one of the HP and LP spools 48, 50. Each stage has its own disk 61. The blades 56, 58 may be part of a blisk, rather than being mounted to a disk. The vanes 60, 62 for a stage of the compressor 24, 26 can be mounted to the core casing 46 in a circumferential arrangement.

The HP turbine 34 and the LP turbine 36 respectively include a plurality of turbine stages 64, 66. A set of turbine blades 68, 70 are rotated relative to a corresponding set of static turbine vanes 72, 74 (also called a nozzle) to extract energy from the stream of fluid passing through the stage 64, 66. In a single turbine stage 64, 66, multiple turbine blades 68, 70 can be provided in a ring and can extend radially outwardly relative to the engine centerline 12, from a blade platform to a blade tip. The corresponding static turbine vanes 72, 74 are positioned upstream of and adjacent to the rotating turbine blades 68, 70. It is noted that the number of blades, vanes, and turbine stages shown in FIG. 1 were selected for illustrative purposes only, and that other numbers are possible.

The turbine blades 68, 70 for a stage of the turbine can be mounted to a disk 71. The disk 71 is mounted to the corresponding one of the HP and LP spools 48, 50. Each stage 64, 66 has a dedicated disk 71. The vanes 72, 74 for a stage 64, 66 of the turbine 34, 36 can be mounted to the core casing 46 in a circumferential arrangement.

Complimentary to the rotor portion, the stationary portions of the engine 10, such as the static vanes 60, 62, 72, 74 among the compressor and turbine sections 22, 32 are also referred to individually or collectively as a stator 63. As such, the stator 63 can refer to the combination of non-rotating elements throughout the engine 10.

In operation, the airflow exiting the fan section 18 is split. A portion of the airflow is channeled into the LP compressor 24, which then supplies pressurized airflow 76 to the HP compressor 26, which further pressurizes the air. The pressurized airflow 76 from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24. The exhaust gas is ultimately discharged from the engine 10 via the exhaust section 38. The driving of the LP turbine 36 drives the LP spool 50 to rotate the fan 20 and the LP compressor 24.

A portion of the pressurized airflow 76 can be drawn from the compressor section 22 as bleed air 77. The bleed air 77 can be drawn from the pressurized airflow 76 and provided to engine components to provide cooling. The temperature of pressurized airflow 76 entering and exiting the combustor 30 is significantly increased. As such, cooling provided by the bleed air 77 is supplied to downstream turbine components (e.g., a blade 68) subjected to the heightened temperature environments.

A remaining portion of the airflow exiting the fan section 18, a bypass airflow 78, bypasses the LP compressor 24 and engine core 44 and exits the engine 10 through a stationary vane row, and more particularly an outlet guide vane assembly 80, comprising a plurality of airfoil guide vanes 82, at a fan exhaust side 84. More specifically, a circumferential row of radially extending airfoil guide vanes 82 can be utilized adjacent the fan section 18 to exert some directional control of the bypass airflow 78.

Some of the air supplied by the fan 20 can bypass the engine core 44 and be used for cooling of portions, especially hot portions, of the engine 10, and/or used to cool or power other aspects of the aircraft. In the context of a turbine engine, the hot portions of the engine are normally downstream of the combustor 30. The turbine section 32 and the HP turbine 34 can be the hottest portion as it is directly downstream of the combustion section 28. Other sources of cooling fluid can be, but are not limited to, fluid discharged from the LP compressor 24 or the HP compressor 26.

Figure 2:
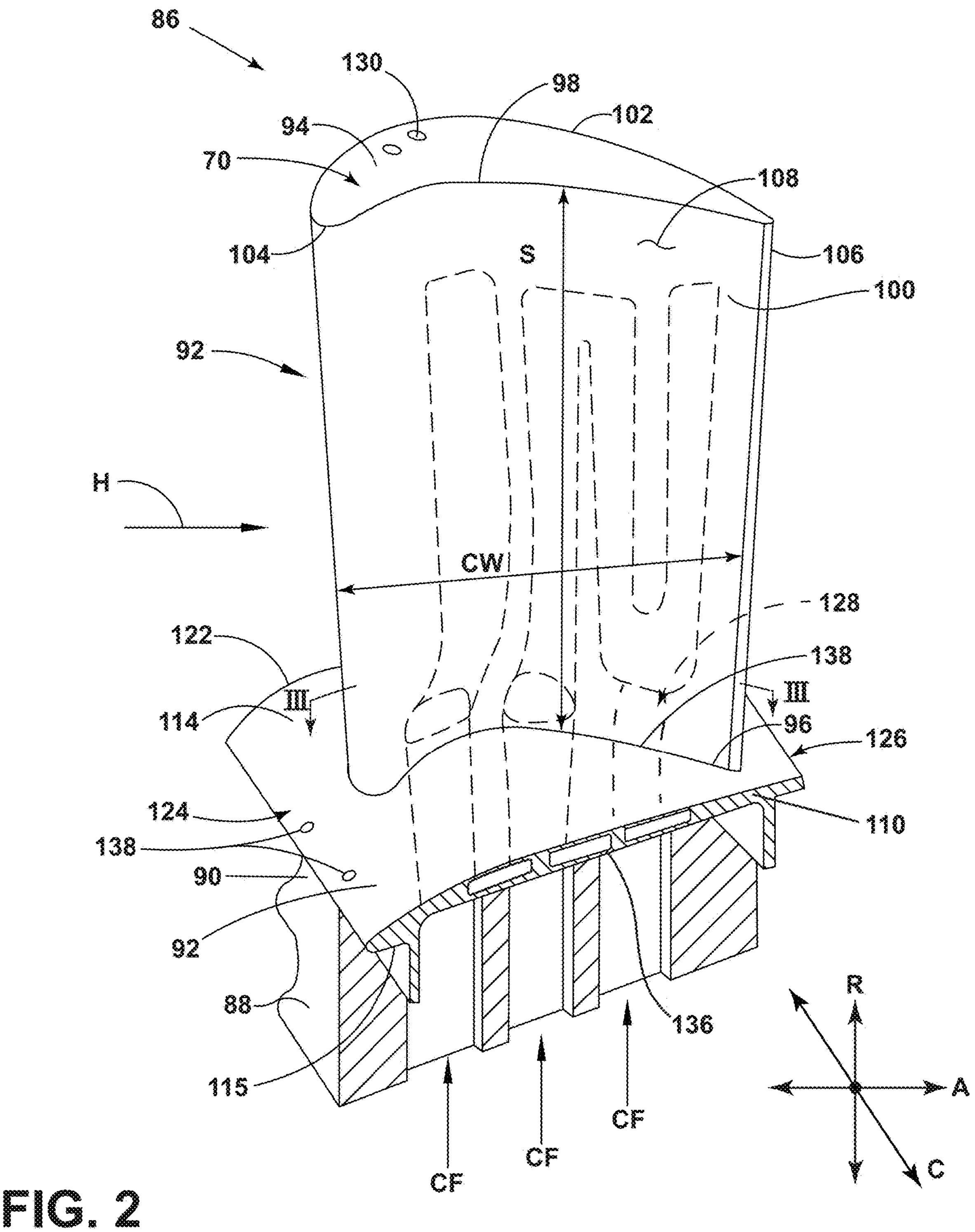
FIG. 2 is a perspective view of an airfoil assembly with an airfoil and a platform according to an aspect of the disclosure herein.

FIG. 2 is a perspective view of an airfoil assembly 86 in the form of a turbine blade assembly with a turbine blade 70 of the engine 10 from FIG. 1. Additionally or alternatively, while described as a turbine blade, the airfoil assembly 86 can be in other forms such as a vane assembly, a strut assembly, a service tube assembly, a shroud assembly, or a combustion liner assembly in non-limiting examples, or any engine component that can utilize cooling.

The airfoil assembly 86 can include a dovetail 88, a shank 90, a platform 92, and an airfoil 94. The airfoil 94 meets the platform 92 to define a root 96. The airfoil 94 extends between the root 96 and a tip 98 in a span-wise direction (denoted "S"). A span length is measured along the span-wise direction between the root 96 and the tip 98. The root 96 represents 0% of the span length while the tip 98 represents 100% of the span length. When multiple platforms 92 and airfoils 94 are circumferentially arranged in a side-by-side relationship, the platforms 92 can help to radially contain the turbine engine mainstream air flow and can form the radially inner wall of an annulus through which the air flows. The dovetail 88 can, for example, be configured to mount to the turbine rotor disk 71 on the engine 10 from FIG. 1.

The airfoil 94 includes a first side 100, illustrated as a concave-shaped pressure side, and a second side 102, illustrated as a convex-shaped suction side. The first and second sides 100, 102 together define a cross-sectional shape of the airfoil 94. The airfoil 94 extends, at least to some degree, between an upstream edge 104, or a leading edge as illustrated, and a downstream edge 106, or a trailing edge as illustrated, to define a chord-wise direction (denoted "CW"). An outer periphery of the airfoil 94 can be bound by an airfoil wall 108, which can also define the first and second sides 100, 102.

The platform 92 can include an upper surface 114 and a lower surface 115 radially spaced from each other to at least partially define an interior 110 of the platform 92, which can include one or more platform chambers 136.

The platform 92 can include a first slash face 122 and a second slash face 123 (FIG. 3) that are spaced from one another in the circumferential direction C. The platform 92 can include a platform leading edge 124 and a platform trailing edge 126 that are spaced from one another in the axial direction A. The slash faces 122, 123, and the edges 124, 126 are referred to herein as blade slash faces 122, 123, 124, 126. It should be understood that the platform 92 can have any appropriate thickness depending on the location of the airfoil assembly 86 in the engine 10.

A set of airfoil cooling holes 130 can be located along any portion of the airfoil wall 108 including along the upstream edge 104, the downstream edge 106, the tip 98 and anywhere else as desired. The set of airfoil cooling holes 130 can pass through a substrate, which by way of illustration is the airfoil wall 108. The airfoil wall 108 can face a hot fluid flow (denoted "H") to define a heated surface. It should be understood, however, that the substrate can be any wall within the engine 10, including but not limited to interior walls, a tip wall, or a combustion liner wall.

The platform 92, the airfoil 94, or both, can include at least a portion of a cooling supply conduit 112 that may provide a cooling fluid flow (denoted "C") to the set of platform chambers 136. The cooling supply conduit 112 can, for example, extend through the platform 92 and to or into the airfoil 94. In some configurations, the cooling supply conduit 112 can provide a cooling fluid flow CF from the shank 90 to the set of platform chambers 136. In some configurations, the cooling supply conduit 112 can provide a cooling fluid flow CF from the airfoil 94 to the set of platform chambers 136. For example, cooling fluid that has already passed through and cooled at least a portion of the airfoil 94 can then be provided to one or more of the platform chambers 136 (e.g., the cooling supply conduit 112 may provide spent air to the set platform chambers 136). The supply conduit 112 can include a plurality of supply conduits and can be fluidly coupled with the set of platform chamber 136 in one or more of a variety of ways, such as via one or more openings, channels, or passages, among others. The set of platform chambers 136 can receive cooling fluid from the same supply conduit 112, from the same plurality of supply conduits 112, or from separate supply conduits of a plurality of supply conduits 112.

Figure 3:
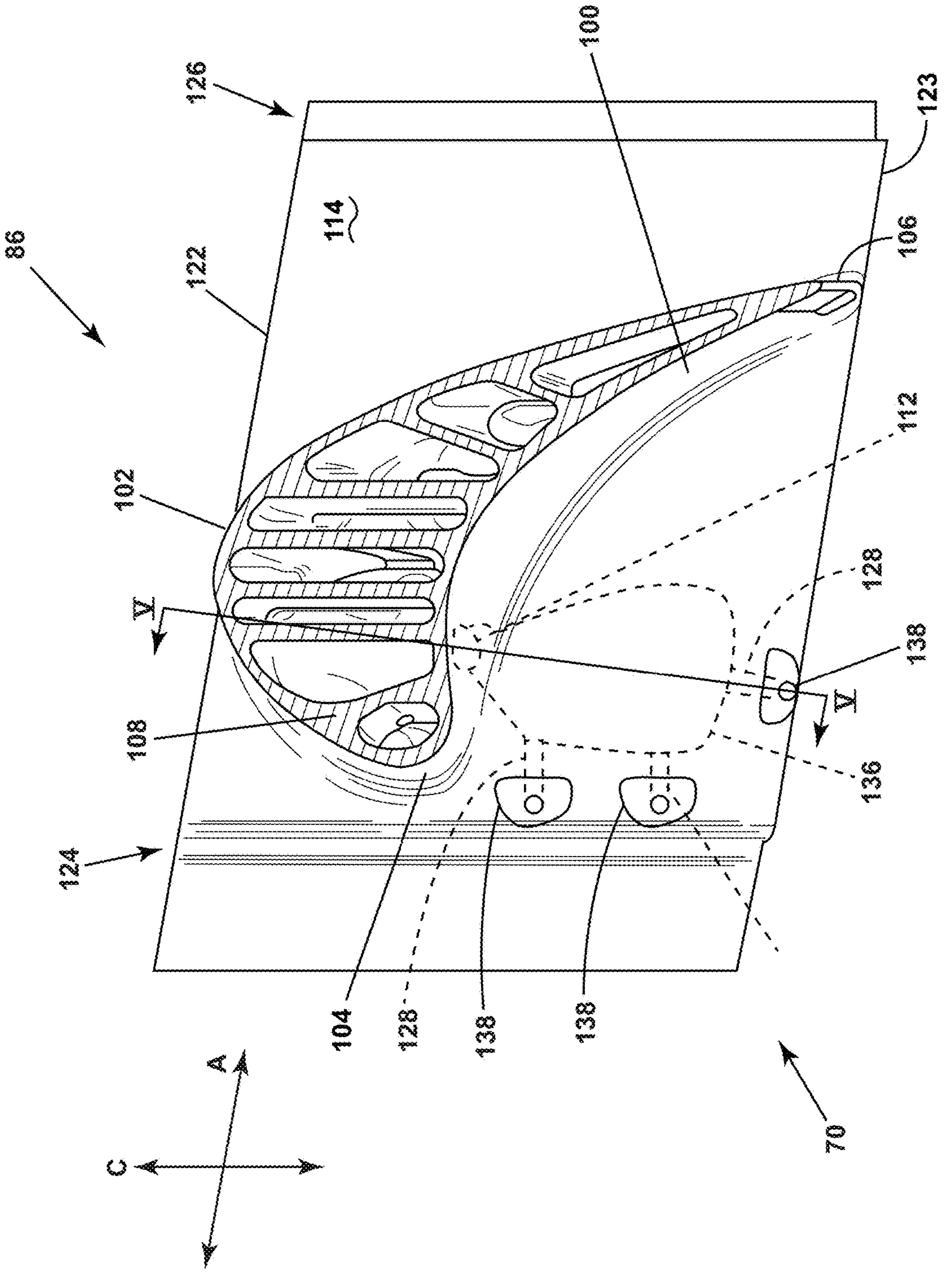
FIG. 3 is a cross-sectional perspective view of the airfoil assembly of FIG. 2, taken along line III-III, according to an aspect of the disclosure herein.
Figure 4:
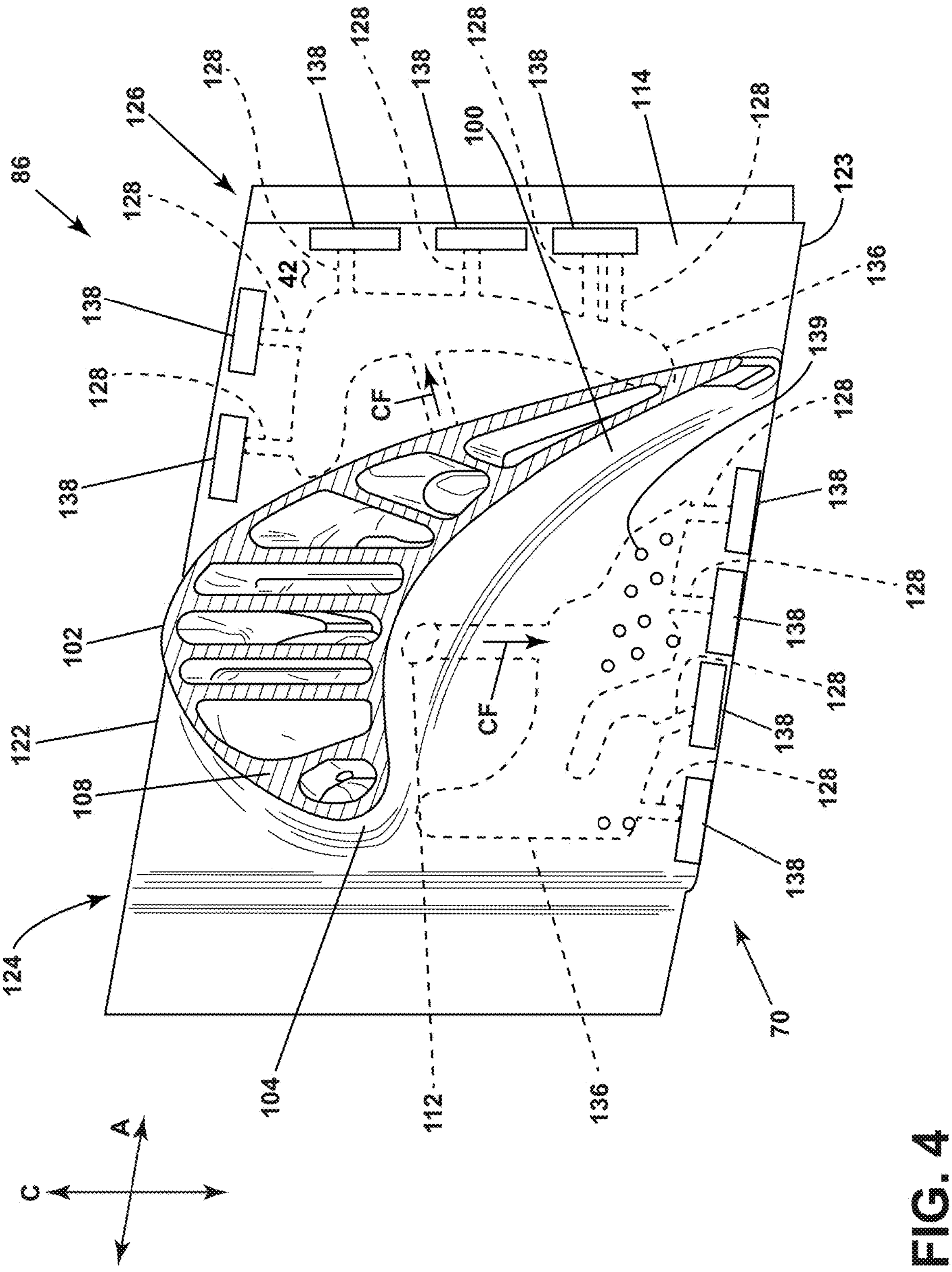
FIG. 4 is a cross-sectional perspective view of a variation of the airfoil assembly FIG. 3.

FIGS. 3 and 4 are schematic cross-sections along line III-III from FIG. 2 and generally illustrate two example variations of the platform 92. The platform 92 can include a set of cooling holes 138. The set of cooling holes 138 can include one or more cooling holes 138 located in the upper surface 114, the lower surface 115, or both (FIGS. 5-8). The cooling holes 138 can be fluidly coupled to the platform chamber 136, such as via a set of impingement channels 128 of the platform 92. The set of cooling holes 138 can, for example, fluidly couple the set of platform chambers 136, the set of impingement channels 128, or both, with the upper surface 114, the lower surface 115, or both.

The set of impingement channels 128 can include one or more impingement channels 128 that extend from a platform chamber 136 toward the first slash face 122, the second slash face 123, the platform leading edge 124, the platform trailing edge 126, or a combination thereof. For example, in the variation illustrated in FIG. 3, one of the set of impingement channels 128 extends toward the second slash face 123, and two of the set of impingement channels 128 are directed toward the leading edge 124. The set of cooling holes 138 can fluidly couple the impingement channels 128 with the upper surface 114, the lower surface 115, or a combination thereof. While various aspects are described in connection with the second slash face 123, the same or similar aspects can apply to the first slash face 122, the platform leading edge 124, the platform trailed edge 126, or a combination thereof. Also, while aspects are described in connection with a single platform chamber, impingement channel, and cooling hole, the same or similar aspects can apply to configurations with a plurality of platform chambers, impingement channels, and cooling holes.

While the platform chamber 136 is generally illustrated in FIG. 3 as a relatively large chamber, the platform chamber 136 can include one or more smaller chambers, conduits, passages, or a combination thereof.

In another example, such as the variation illustrated in FIG. 4, some impingement channels 128 extend from a first platform chamber 136 toward the second slash face 123, some impingement channels 128 extend from a second platform chamber 136 toward the platform trailing edge 126, and some impingement channels 128 extend from the second platform chamber 136 toward the first slash face 122. The cooling holes 138 can fluidly couple the impingement channels 128 with the upper surface 114, the lower surface 115, or a combination thereof.

Other examples can include various combinations of impingement channels 128, platform chambers 136, and cooling holes 138. In some configurations, two or more impingement channels 128 can be fluidly coupled to the same cooling hole 138. Additionally or alternatively, two or more cooling holes 138 can be fluidly coupled to the same impingement channel 128.

In some configurations, a platform 92 can include one or more platform cooling holes 139 that may not be disposed at or about the first slash face 122, the second slash face 123, the platform leading edge 124, the platform trailing edge 126, or a combination thereof (see, e.g., FIG. 4). The platform cooling holes 139 may or may not be fluidly coupled with impingement channels 128. The platform cooling holes 139 can be fluidly coupled with the platform chamber 136.

FIGS. 5-8 are schematic cross-sections taken along line V-V of FIG. 3 illustrating four examples of an impingement channel 128. The impingement channel 128 can include a first segment 140 and a second segment 142. The first segment 140 can be at least partially defined between the upper surface 114 and the lower surface 115. The first segment 140 can extend from a platform chamber 136 toward the second slash face 123. The first segment 140 can include a first segment centerline 140*a* that intersects with the slash face 123. In some configurations, the first segment 140 can extend directly toward the second slash face 123. Here, the first segment centerline 140*a* is perpendicular to the second slash face 123. In other configurations, the first segment 140 can be disposed such that the centerline 140*a* is at an oblique angle relative to the second slash face 123.

In yet other configurations, a set of impingement channels 128 can include one or more impingement channels 128 having first segments 140 with centerlines 140*a* perpendicular to one or more of the first slash face 122, the second slash face 123, the platform leading edge 124, or the platform trailing edge 126, and one or more other impingement channels 128 having first segments 140 with centerlines 140*a* at oblique angles relative to the first slash face 122, the second slash face 123, the platform leading edge 124, or the platform trailing edge 126.

In some configurations, a first segment centerline 140*a* can be generally parallel to a plane defined by the platform 92 (see, e.g., the first segment centerlines 140*a* in the examples illustrated in FIGS. 5-8). In other configurations, a first segment centerline 140*a* can be angled, at least to some degree, toward the upper surface 114 or the lower surface 115. Some configurations can include one or more first segments 140 with centerlines 140*a* that are generally parallel to the platform 92 and one or more first segments 140 with centerlines 140*a* that are angled relative to the platform 92, such as toward the upper surface 114 or the lower surface 115. In some examples, such as with first segments 140 that extend directly toward a slash face 122, 123 aligned with the axial direction, the first segment centerline 140*a* can be perpendicular to the axial direction, perpendicular to the radial direction, or both.

With some examples, the first segment 140 can include a first impingement surface 144 (e.g., a surface internal to the platform 92). The first impingement surface 144 can be perpendicular to the centerline 140*a*, parallel to the second slash face 123, or a combination thereof. The first segment centerline 140*a* may extend from the platform chamber 136 to the first impingement surface 144 and intersect the second slash face 123. In some configurations, the first impingement surface 144 is adjacent the second slash face 123, which may facilitate cooling of the slash face 123. For example, cooling provided via cooling fluid flow CF contacting the first impingement surface 144 can generate an impingement cooling region 148 in the second slash face 123. The first impingement surface 144 being adjacent the second slash face 123 can include the first impingement surface 144 being disposed at a distance D from the second slash face 123. A portion of the platform 92 between the platform chamber 136 and the upper surface 114 can include a height/thickness H (e.g., in the radial direction). The distance D can, for example, be equal to or between 30% and 300% of the height/thickness H, such as equal to or between 70% and 170% (see, e.g., FIGS. 5 and 7). An impingement surface, such as the first impingement surface 144, can include a surface of the impingement channel 128 where airflow or at least a portion of airflow stagnates, such as resulting from a change in direction of the flow path in the impingement channel 128 (e.g., at the angled transition from the first segment 140 to the second segment 142).

With some aspects, the first segment 140 can have one or more dimensions that are smaller than the platform chamber 136. The dimensions increase the speed of the cooling fluid flow CF toward the first impingement surface 144 to provide impingement cooling. For example, a radial extent or dimension 140*r* (e.g., a length in the radial direction R) of the first segment 140 can be 40% or less of a radial extent or dimension 136*r* of the platform chamber 136 at the proximal end of the first segment 140, a maximum of the radial extent or dimension 136*r*, or both. In some examples, the radial extent or dimension 140*r* can be equal to or between 10% and 40% of the maximum of the radial extent or dimension 136*r*. Additionally or alternatively, a cross-sectional area of the first segment 140 can be less than the cross-sectional area of the platform chamber 136. For example, the cross-sectional area of the first segment 140 can be between 5% and 95% of the cross-sectional area of the platform chamber 136.

The cross-sectional area, for example, can be measured in a plane that is parallel to the radial direction, a plane that is perpendicular to the first segment centerline 140*a*, or a plane that is parallel to the radial direction R and perpendicular to the first segment centerline 140*a*. The cross-sectional area can be determined at the proximal end of the first segment 140, as an average value, or as a maximum value. In some configurations, the first segment 140 can be spaced from at least one of the upper surface 114 or the lower surface 115 to a greater extent than the platform chamber 136. For example and without limitation, the first segment 140 can be at least 40% farther from the upper surface 114, at least 40% farther from the lower surface 115, or both, than the platform chamber 136. In some examples, the first segment 140 can extend from, be aligned with, or both, a middle of the platform chamber 136 (e.g., the centerline 140*a* can be disposed at or about halfway between the upper surface 114 and the lower surface 115). Additionally or alternatively, the first segment 140 can be disposed such that the first impingement surface 144 is aligned with a middle section (e.g., a middle 60%, a middle third, etc.) of the second slash face 123, which may include the first segment centerline 140*a* extending through the middle section.

The second segment 142 of an impingement channel 128 can extend from a distal end 140*b* of the first segment 140 toward the upper surface 114 (FIG. 5), toward the lower surface 115 (FIG. 6), or both. A hydraulic diameter of at least one portion of the second segment 142 can be smaller than the hydraulic diameter of the first segment 140. The decrease in hydraulic diameter increases fluid velocity to facilitate impingement cooling. The second segment 142 can be at least partially defined between the first impingement surface 144 and the upper surface 114 or the lower surface 115.

Figure 5:
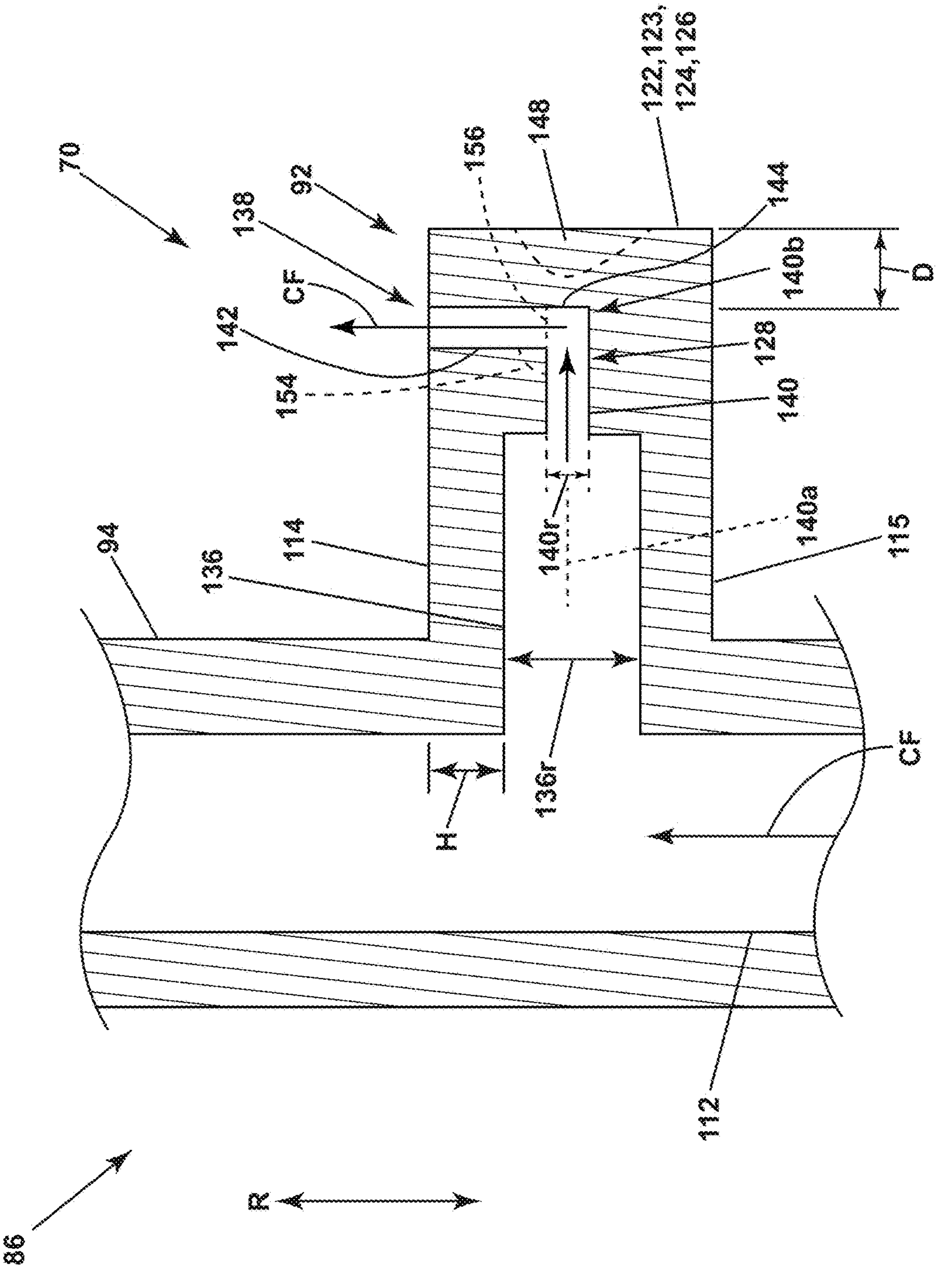
FIG. 5 is a schematic cross-section of the platform and airfoil of FIG. 3, taken along line V-V, according to an aspect of the disclosure herein.
Figure 6:
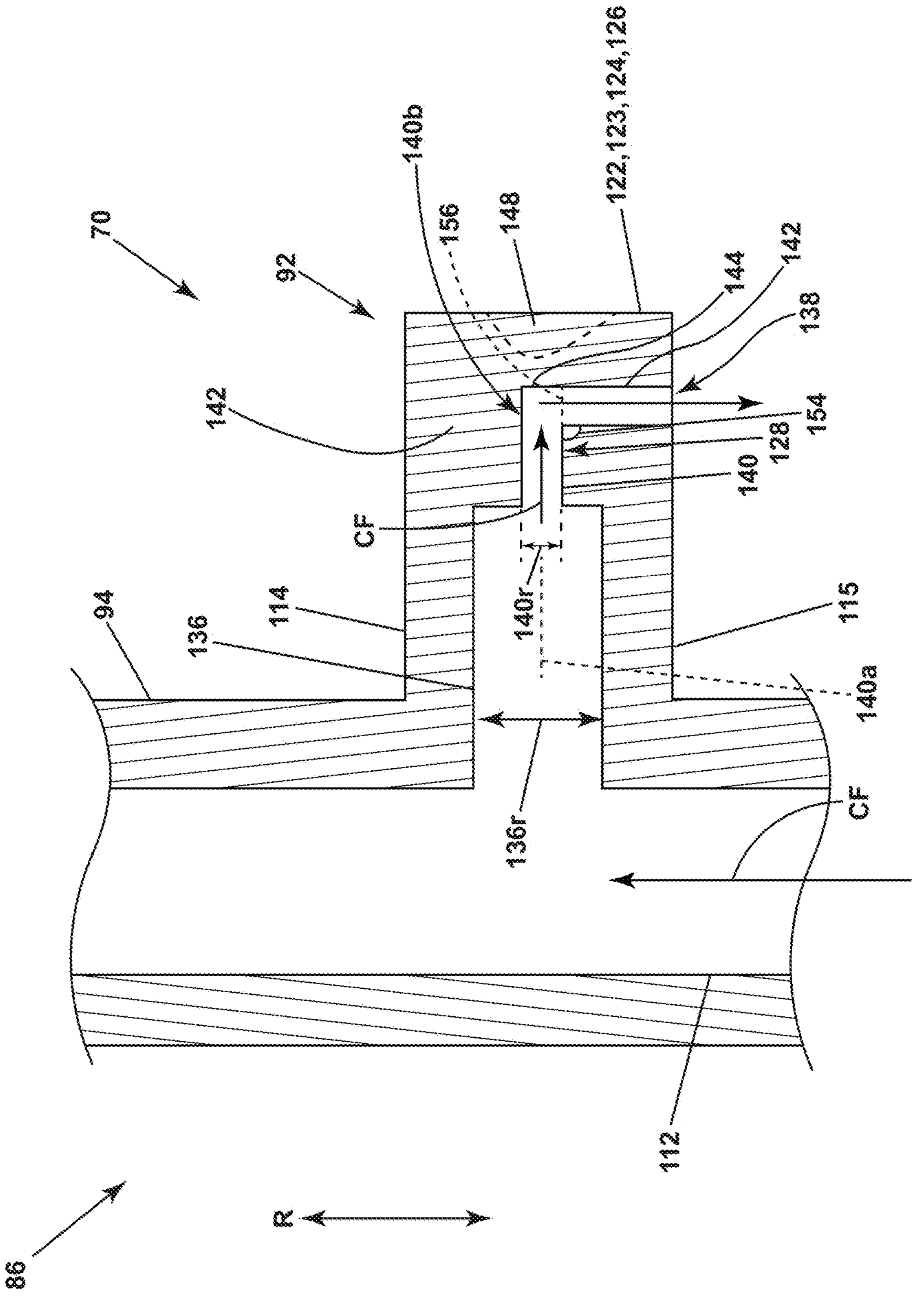
FIG. 6 is a schematic cross-section of a variation of the platform and airfoil of FIG. 5.
Figure 7:
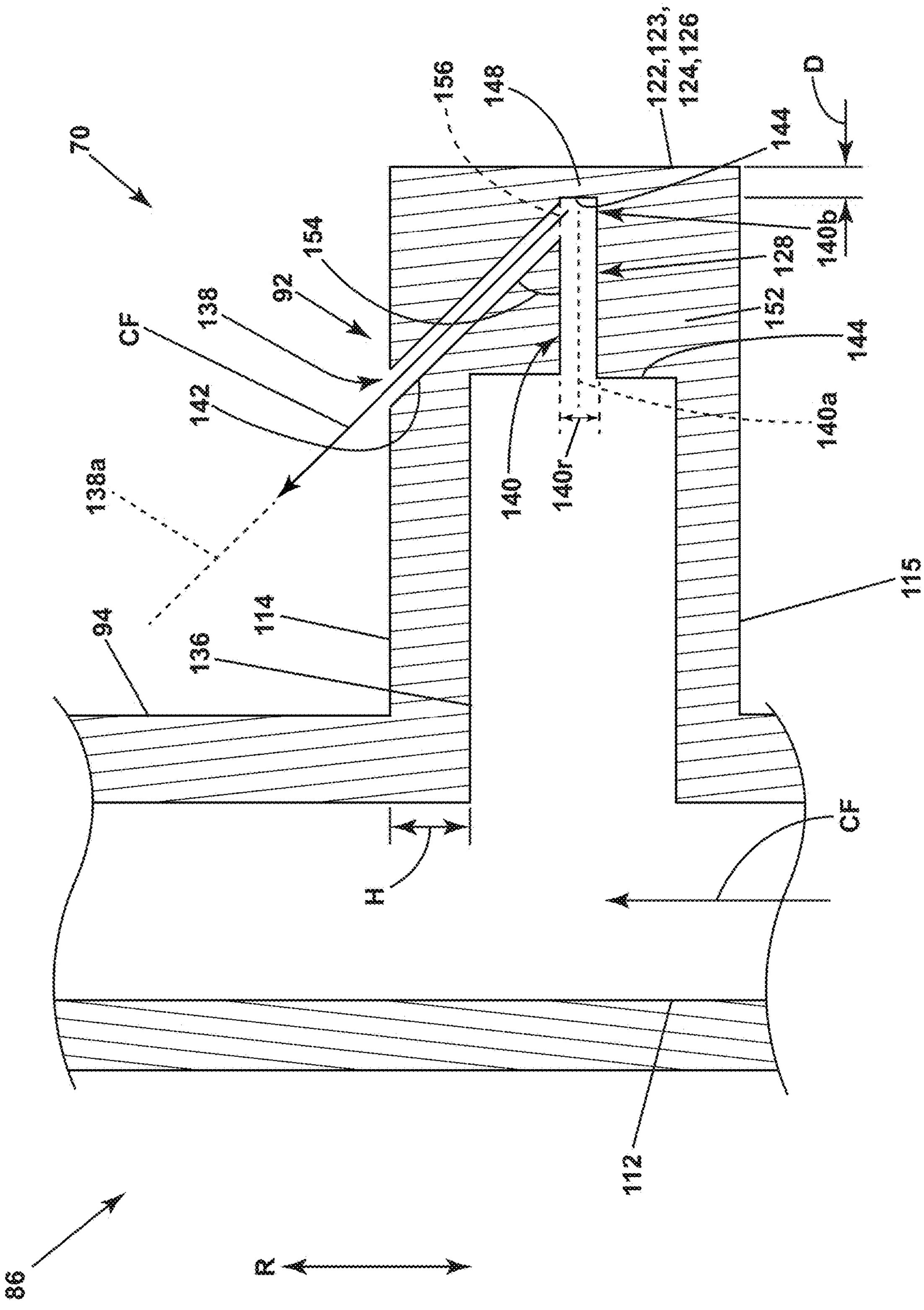
FIG. 7 is a schematic cross-section of another variation of the platform and airfoil of FIG. 5 according to an aspect of the disclosure herein.

At least a portion of the second segment 142 can be disposed at an angle 154 relative to the first segment 140. The angle 154 can, for example, be equal to or between 80 degrees and 100 degrees, and can be 90 degrees in some examples, such as generally illustrated in FIGS. 5 and 6. With other examples, such as generally illustrated in FIG. 7, the angle 154 can be equal to or between 30 and 60 degrees, such as about 45 degrees. The second segment 142 can be parallel to the slash faces 122, 123 or can be disposed at angle (e.g., an oblique angle) thereto. Additionally or alternatively, the second segment 142 can be substantially parallel with the radial direction, in some configurations (see, e.g., FIGS. 5 and 6). In other configurations, the second segment 142 can be angled relative to the radial direction (see, e.g., FIG. 7), such as toward the airfoil 94 or away from the airfoil 94. For example, in some configurations, a centerline 138*a* extending through the center of the cooling hole 138 can intersect the airfoil 94. The centerline 138*a* can also extend through the center of the second segment 142.

The second segment 142 can extend from an opening 156 at the distal end of the first segment 140. For example, with a second segment 142 that extends, at least to some degree, toward the upper surface 114 (FIGS. 5 and 7), the opening 156 may be disposed at an outer radial part of the distal end of the first segment 140. With a second segment 142 that extends, at least to some degree, toward the lower surface 115 (FIG. 4), the opening 156 may be disposed at an inner radial part of the distal end of the first segment 140. The first segment 140 may extend from the platform chamber 136 to the first impingement surface 144, and the second segment 142 may extend from the first impingement surface 144 such that the first segment 140 and the second segment 142 overlap in the radial direction, at least to some degree, such that the first segment centerline 140*a* does not extend into the second segment 142, or both.

The first segment 140 and the second segment 142 can include one or more of a variety of cross-sectional shapes. For example, the first segment 140, the second segment 142, or both, can include one or more portions that have round, square, oval-shaped, rectangular, or polygonal cross-sectional shapes, or combinations thereof.

Figure 8:
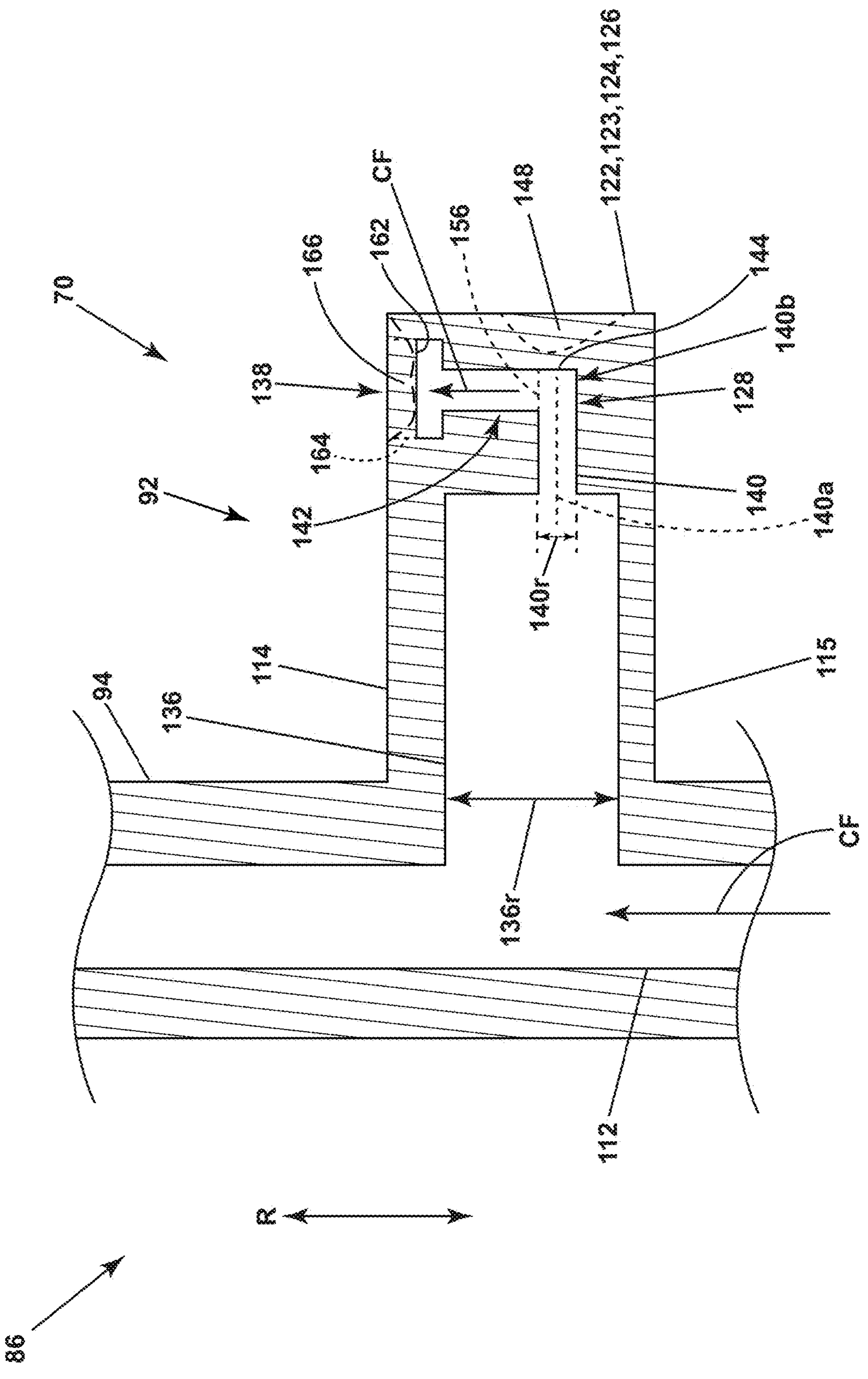
FIG. 8 is a schematic cross-section of an additional variation of the platform and airfoil of FIG. 5 according to an aspect of the disclosure herein.
Figure 9A:
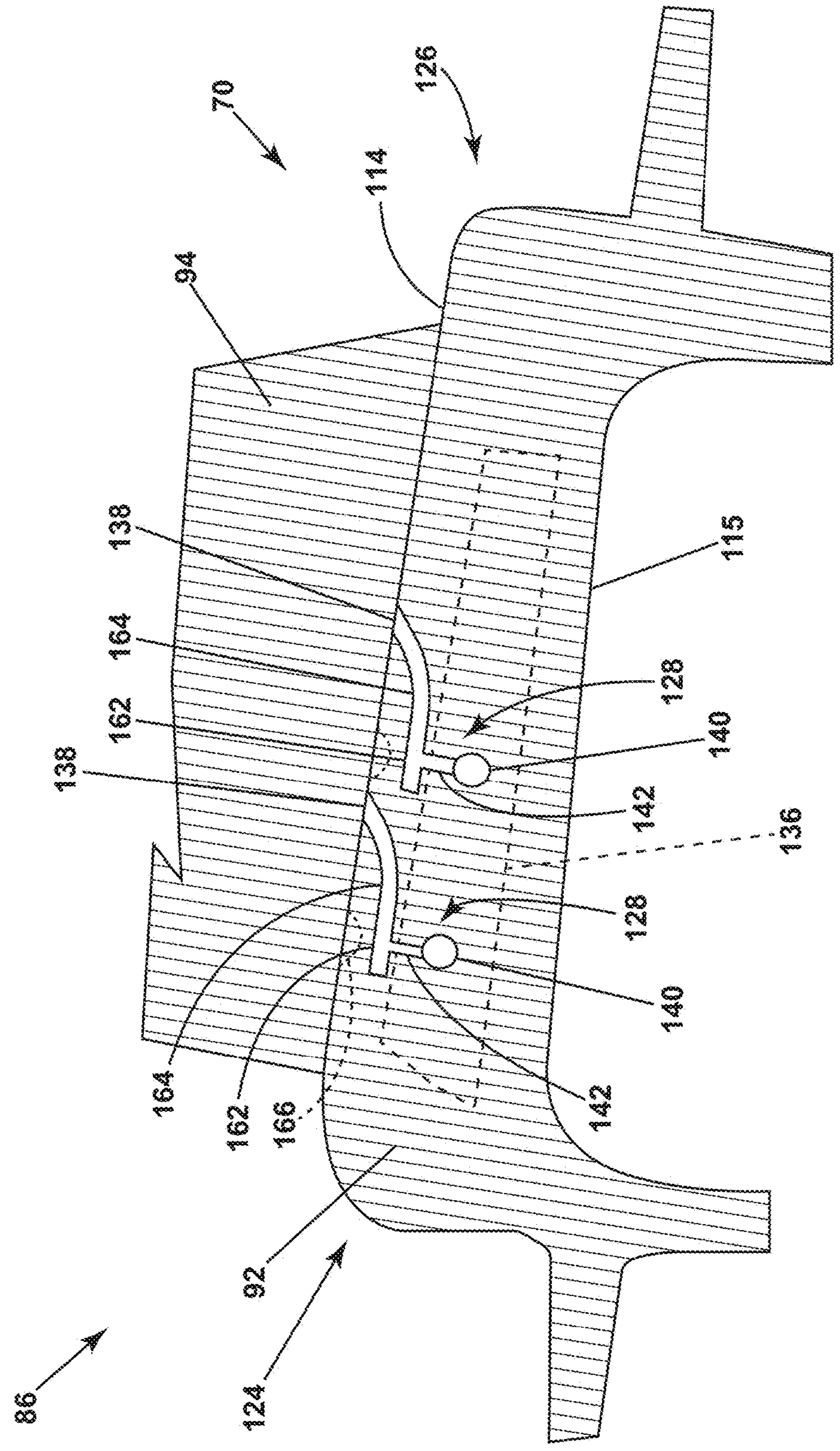
FIG. 9A is a schematic cross-section of the platform of FIG. 8.
Figure 9B:
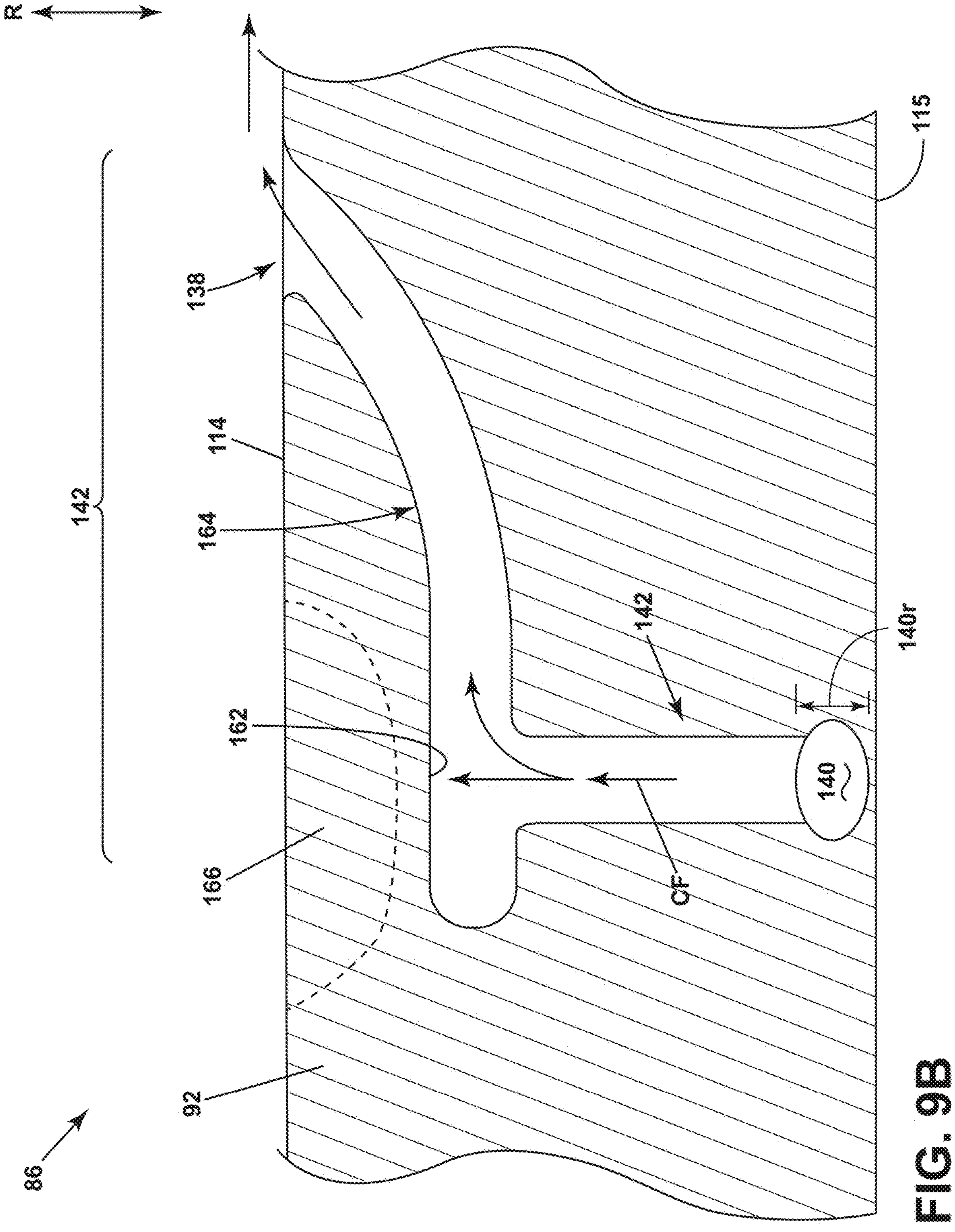
FIG. 9B is an enlarged schematic cross-section of the second segment of the impingement channel of the platform of FIG. 8 according to an aspect of the disclosure herein.

FIGS. 8, 9A, and 9B are schematic cross-sections of a variation of an impingement channel 128, with FIG. 9A showing a rotated view of the impingement channel 128 of FIG. 8 and FIG. 9B showing an enlarged view of the second segment 142 and a third segment 164 of the impingement channel 128. The second segment 142 can extend to a second impingement surface 162. The second segment 142 can extend to the second impingement surface 162 such that fluid that flows through the first segment 140 flows to the first impingement surface 144, through the second segment 142, and toward the second impingement surface 162.

A hydraulic diameter of at least one portion of the second segment 142 can be smaller than the hydraulic diameter of the first segment 140. The decrease in hydraulic diameter increases cooling fluid velocity toward the second impingement surface 162 to facilitate impingement cooling. The second impingement surface 162 can be provided at the end of the second segment 142 and adjacent the upper surface 114 or the lower surface 115. The second impingement surface 162 can be angled (e.g., at an oblique or right angle) relative to the first impingement surface 144.

Cooling provided via cooling fluid flow CF contacts the second impingement surface 162 and generates an impingement cooling region 166 between the second impingement surface 162 and the upper surface 114. With other examples, such as with cooling holes 138 disposed at the lower surface 115, the cooling fluid flow CF contacts the second impingement surface 162 and generates the impingement cooling region 166 between the second impingement surface 162 and the lower surface 115. The third segment 164 can extend from the second impingement surface 162 toward the cooling hole 138. The cooling hole 138 is an outlet of the impingement channel 128. For example, the third segment 164 can be curved, angled, or both, toward the upper surface 114 or the lower surface 115, which may include the cooling hole 138. Additionally or alternatively, the third segment 164 can be angled relative to the second segment 142, which may cause cooling fluid to slow down or stagnate at the second impingement surface 162.

With some aspects, the leading edge 124, the trailing edge 126, or both, of the platform 92 can be angled, curved, or both.

Figure 10:
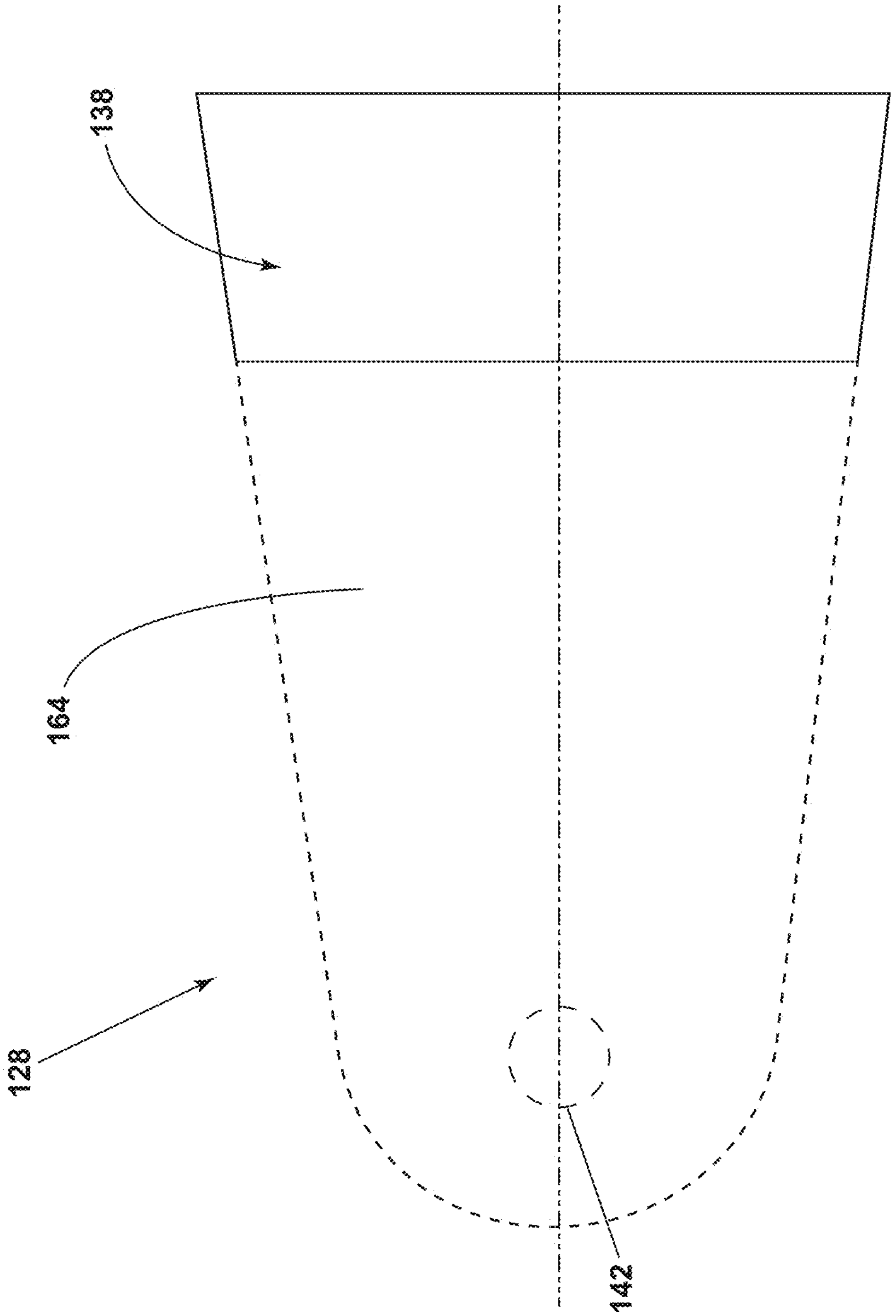
FIG. 10 is a schematic view of a cooling hole of a platform according to an aspect of the disclosure herein.

As generally illustrated in FIGS. 9A, 9B, and 10, one or more dimensions of the third segment 164, the cooling hole 138, or both, can be larger than dimensions of the second segment 142, the first segment 140, or both. For example, the third segment 164 and the cooling hole 138 can function as a diffusion channel to spread out and slow down the cooling fluid flow CF as it reaches the upper surface 114 to facilitate formation or maintenance of a film. That is, as shown in FIGS. 9A, 9B, and 10, for example, a hydraulic diameter of the third segment 164 is larger than a hydraulic diameter of the second segment 142. The geometry of the third segment 164 enables an expansion of the cooling fluid (C) to form a wider and slower cooling film on the upper surface 114.

In some configurations, the first segment 140 may increase the speed of the cooling fluid flow C, the second segment 142 may maintain or further increase the speed of the cooling fluid flow C, and the third segment 164 may decrease the speed of the cooling fluid flow C.

During operation, the cooling fluid flow CF can be supplied to one or more cooling supply conduits 112 and passed along to the at least one platform chamber 136, where the cooling fluid flow CF can enter an impingement channel 128. The cooling fluid flow CF can then flow through the first segment 140 to cool the first impingement surface 144, flow through the second segment 142 to cool the second impingement surface 162, flow through the third segment 164 to the cooling hole 138, and flow out through the upper surface 114 via the cooling hole 138 to provide a film at the upper surface 114. In this example, the cooling fluid flow CF provides impingement cooling to two impingement surfaces 144, 162, at least one of which can be adjacent a slash face 122, 123 or an edge 124, 126, before exiting via the cooling hole 138. Such a configuration can allow for (i) cooling of the slash face 122, 123 or an edge 124, 126, (ii) cooling a region adjacent the upper surface or the lower surface, and (iii) providing or contributing to a film at the upper surface 114, all via one impingement channel 128 fluidly coupled with one cooling hole 138. The set of impingement channels 128 and the set of cooling holes 138 may not be directly fluidly coupled with a slash face 122, 123 or an edge 124, 126. For example, with some aspects, all cooling fluid flow CF that enters an impingement channel 128 exits the platform 92 via a cooling hole 138 in the upper surface 114, and not through a hole in a slash face 122, 123 or an edge 124, 126. Additionally or alternatively, some or all of the slash faces 122, 123 and the edges 124, 126 may not include cooling holes formed therein.

Figure 11:
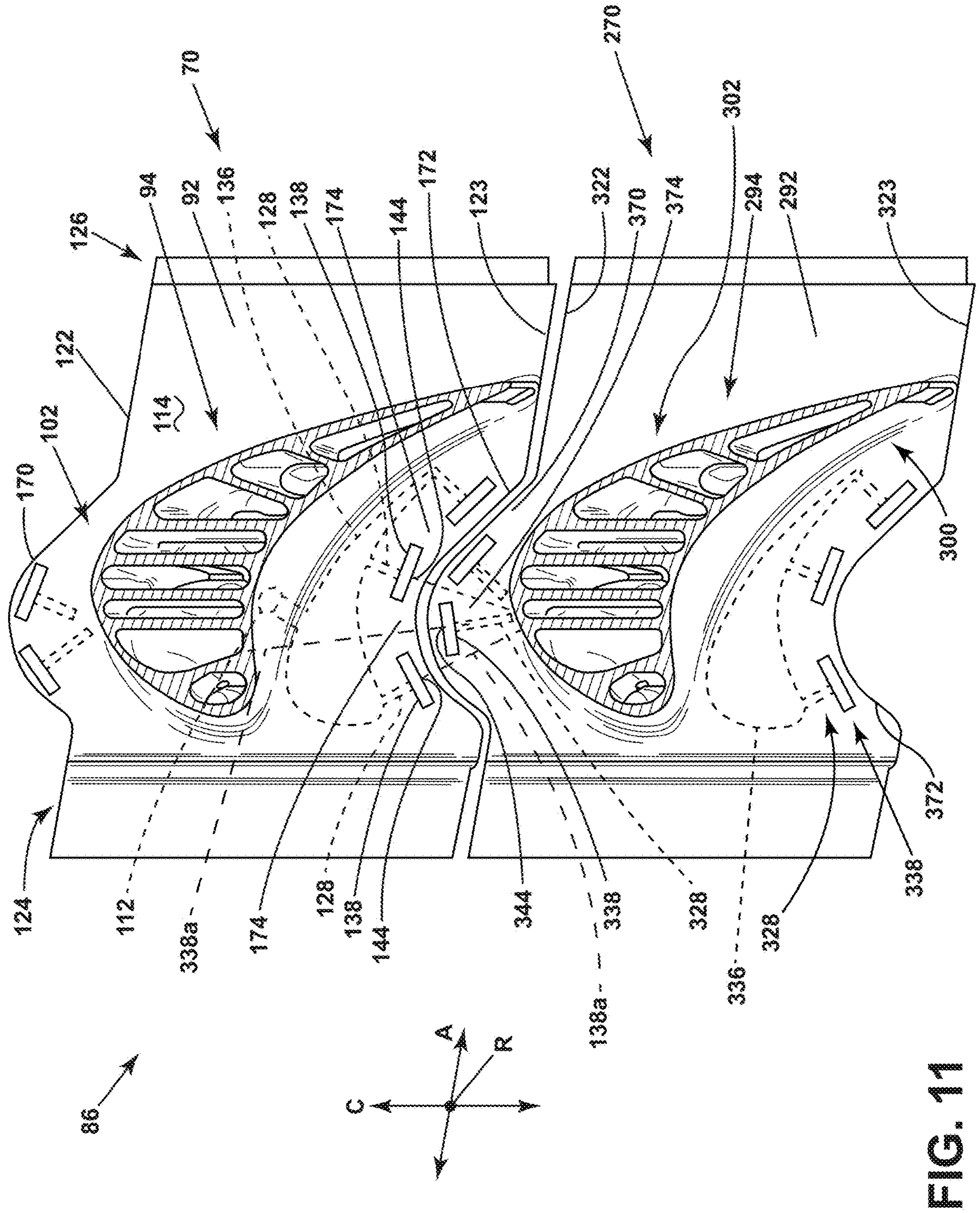
FIG. 11 is a cross-sectional perspective via of an airfoil assembly include first and second platforms and first and second airfoils according to an aspect of the disclosure herein.

FIG. 11 is a schematic cross-section of an example of an airfoil assembly 86. The airfoil assembly 86 can include the first blade 70 with the first platform 92 and the first airfoil 94, and a second blade 270 with a second platform 292, and a second airfoil 294 extending from the second platform 292. The second platform 292 and the second airfoil 294 can include aspects similar to those of the first platform 92 and the first airfoil 94, respectively; therefore, like parts will be described with like numerals further increased by 200, with it being understood that the description of the like parts of the first platform 92 and the first airfoil 94 can apply to the second platform 292 and the second airfoil 294, unless noted otherwise.

The second platform 292 can include a first slash face 322, a second slash face 323, and a set of second cooling holes 338. The set of second cooling holes 338 can be disposed adjacent the first slash face 322, the second slash face 323, or both.

The platforms 92, 292 can be disposed adjacent to each other in the circumferential direction such that the second slash face 123 of the first platform 92 is adjacent to the first slash face 322 of the second platform 292. The platforms 92, 292 can include a protrusion 170, 370 and a recess 172, 372 that can be provided at and include at least a portion of the first slash faces 122, 322 and the second slash faces 123, 323, respectively. For example, the second slash face 123 of the first platform 92 can be concave and at least partially define the recess 172, and the first slash face 322 of the second platform 292 can be convex and at least partially define the protrusion 370. The protrusion 370 can be disposed at least partially in the recess 172.

The platforms 92, 292 can include cooling holes 138, 338 that can be disposed at and along the protrusions 170, 370, the recesses 172, 372, or both. In some configurations, the cooling holes 138 (of the first platform 92) disposed at the recess 172 and the cooling holes 338 (of the second platform 292) disposed at the protrusion 370 are arranged in an alternating configuration relative to one another. For example, the cooling holes 138 may be offset along the recess 172 such that regions 174 of the first platform 92 (e.g., the upper surface 114 or the lower surface 115) are disposed between adjacent cooling holes 138, and the cooling holes 338 may be aligned with the regions 174. Additionally or alternatively, the cooling holes 338 may be offset along the protrusion 370 such that regions 374 of the second platform 292 are disposed between adjacent cooling holes 338, and the cooling holes 138 may be aligned with the regions 374.

In some configurations, shapes of the protrusions 170, 370 and recesses 172, 372 can correspond, at least to some degree, to the shape of the respective airfoils 94, 294. For example, the protrusions 170, 370 can be disposed at and include a curvature similar to the second/suction sides 102, 302 of the airfoils 94, 294, and the recesses 172, 372 can be disposed at and include a curvature corresponding to the first/pressure sides 100, 300 of the airfoils 94, 294.

The second platform 292 can include a set of impingement channels 328. The set of impingement channels 328 can include impingement surfaces 344 that can be disposed at the first slash face 322, the second slash face 323, or both. The impingement surfaces 144 of the first platform 92 and the impingement surfaces 344 of the second platform 292 can be disposed in an alternating configuration relative to one another. For example, the impingement surfaces 144 may be offset along the recess 172 such that the regions 174 of the first platform 92 are aligned between adjacent impingement surfaces 144. The impingement surfaces 344 may be aligned with the regions 174. Additionally or alternatively, the impingement surfaces 344 may be offset along the protrusion 370 such that the regions 374 of the second platform 292 are aligned between adjacent impingement surfaces 344. The impingement surfaces 144 may be aligned with the regions 374. The cooling holes 338 of the second platform 292 can be fluidly coupled with one or more impingement channels 328.

While the alternating configuration of the cooling holes 138, 338 and the impingement surfaces 144, 344 are illustrated in connection with platforms 92, 292 having corresponding protrusions 170, 370 and recesses 172, 372, cooling holes 138, 338 and the impingement surfaces 144, 344 can also be provided in alternating configurations for platforms having linear slash faces, such as slash faces 122, 123 of platform 92 shown in FIG. 3.

In some configurations, centerlines 138*a* through the centers of the cooling holes 138 can intersect with the second airfoil 294, and centerlines 338*a* through the centers of the cooling holes 338 can intersect with the first airfoil 94. In examples of impingement channels 128, 328 without third segments (e.g., the third segment 164 shown in FIGS. 8-9B), the centerlines 138*a*, 338*a* can be concentric with the centerlines of the second segments 142 of the impingement channels 128, 328.

With some aspects, the platform 92, 292 can be formed via one or more of a variety of methods, which can include additive manufacturing. For example, the platform 92, 292 can be formed via additive manufacturing to include a set of impingement channels 128, 328 and a set of cooling holes 138, 338 such as without a separate material removal process (e.g., drilling, laser drilling, electroforming, electrical discharge machining (EDM), or combinations thereof, among others). In some configurations, the impingement channels 128, 328 include continuous inner surfaces of the platform 92, 292 (e.g., without seams, gaps, seals, plugs, or caps that can result from other manufacturing methods).

In some examples, the cooling fluid flow CF provided to the platform chamber 136, 336 can include spent or warm air that has already been used to cool one or more other components or portions, such as the airfoil 94, 294. Such spent or warm air may still be cool enough to provide cooling to the platform 92, 292, an adjacent airfoil 94, 294, or both.

Figure 12:
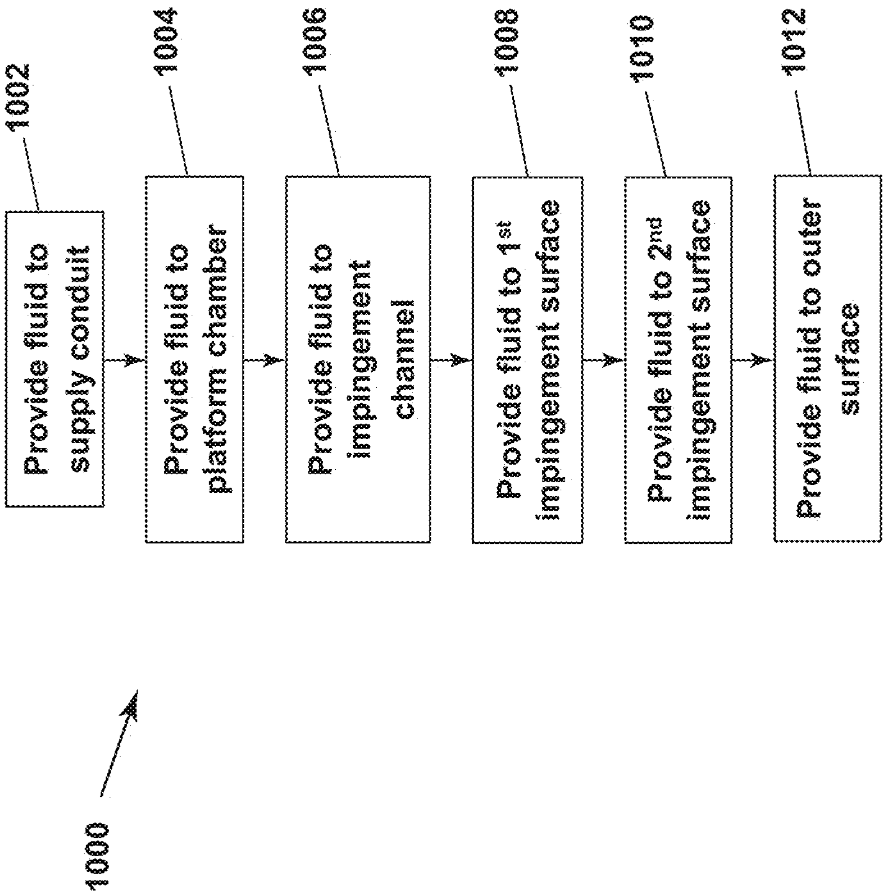
FIG. 12 is a flow diagram of a method of cooling an airfoil assembly according to an aspect of the disclosure herein.

Referring to FIG. 12, a method 1000 of cooling an airfoil assembly 86 can include providing cooling fluid CF to one or more cooling conduits 112 of the platform 92 (block 1002), providing the cooling fluid CF to one or more platform chambers 136 (block 1004), providing the cooling fluid CF to an impingement channel 128 (block 1006), providing the cooling fluid CF to a first impingement surface 144 to provide first impingement cooling (block 1008), providing the cooling fluid CF to a second impingement surface 162 to provide second impingement cooling (block 1010), providing cooling fluid CF to an outer surface (e.g., upper surface 114, lower surface 115, or both) of the platform 92 to form or contribute to a cooling fluid film (block 1012), or a combination thereof. For example, cooling fluid CF may flow into the one or more supply conduits 112, from the one or more supply conduits 112 into the one or more platform chambers 136, from the one or more platform chambers 136 into an impingement channel 128, within a first segment 140 of the impingement channel 128 to a first impingement surface 144, from the first impingement surface 144 into a second segment 142 of the impingement channel 128, within the second segment 142 to a second impingement surface 162, and from the second impingement surface 162 to the third segment 164, and from the third segment 164 out through a cooling hole 138 to the upper surface 114 or the lower surface 115.

Materials used to form the airfoil assembly 86 can include, but are not limited to, steel, refractory metals such as titanium, or superalloys based on nickel, cobalt, or iron, and ceramic matrix composites. The airfoil assembly 86 can be formed by a variety of methods, including additive manufacturing, casting, electroforming, or direct metal laser melting, in non-limiting examples. With some aspects, the platform 92, 292 can be formed via one or more of a variety of methods, which can include additive manufacturing. For example, the platform 92, 292 can be formed via additive manufacturing to include a set of impingement channels 128, 328 and a set of cooling holes 138, 338 such as without a separate material removal process (e.g., drilling, laser drilling, electroforming, electrical discharge machining (EDM), or combinations thereof, among others). In some configurations, the impingement channels 128, 328 include continuous inner surfaces of the platform 92, 292 (e.g., without seams, gaps, seals, or caps that can result from other manufacturing methods).

Many other possible aspects and configurations in addition to those shown in the above figures are contemplated by the present disclosure. The aspects disclosed herein can improve the cooling of an airfoil assembly. For example, airfoil assemblies as disclosed herein can efficiently use cooling fluid, such as bleed air, to remove heat from the platform surfaces, prior to ejecting via film, to additionally cool one or more surfaces of the flow path. This efficient use of cooling can help reduce the amount of bleed air used to cool the hardware. The airfoil assemblies disclosed herein also allow for heat removal close to the edges of the hardware which are traditionally challenging to cool. The effect of the concepts allows for efficient use of bleed flow and reduced surface and edge temperatures, which translates to greater durability and longer service life.

It should be understood that any combination of the geometry related to cooling holes and impingement channels discussed herein is contemplated. The varying aspects of the disclosure discussed herein are for illustrative purposes and not meant to be limiting. It should be appreciated that application of the disclosed design can be for any applicable components, including any component in need of coating and masking.

Further aspects are provided by the subject matter of the following clauses:

An airfoil assembly for a turbine engine, the airfoil assembly comprising: a platform including: an upper surface and a lower surface that are spaced from one another in a radial direction; a leading edge and a trailing edge that are spaced from one another in an axial direction; and a first slash face and a second slash face that are spaced from one another in a circumferential direction; an airfoil extending from the platform in the radial direction, the airfoil including a root that is proximal to the platform and a tip that is distal from the platform; a platform chamber defined at least partially by between the upper surface and the lower surface; an impingement channel located within the platform, the impingement channel including: a first segment extending from the platform chamber toward a first impingement surface that is adjacent one of the first slash face, the second slash face, the leading edge, or the trailing edge, and a second segment extending from a distal end of the first segment toward the upper surface or the lower surface; and a cooling hole fluidly coupling a distal end of the impingement channel with the upper surface or the lower surface.

The airfoil assembly of any preceding clause, further comprising a second impingement channel located within the platform; wherein the first impingement surface is adjacent the first slash face; and wherein the second impingement channel includes a second channel first impingement surface adjacent the second slash face.

The airfoil assembly of any preceding clause, further comprising a third impingement channel located within the platform; and wherein the third impingement channel includes a third channel first impingement surface adjacent the leading edge or the trailing edge.

The airfoil assembly of any preceding clause, wherein the impingement channel includes a second impingement surface disposed at a distal end of the second segment.

The airfoil assembly of any preceding clause, wherein the second impingement surface is not parallel to the first impingement surface.

The airfoil assembly of any preceding clause, wherein the second impingement surface is adjacent the upper surface or the lower surface.

The airfoil assembly of any preceding clause, wherein the impingement channel comprises continuous inner surfaces of the platform.

The airfoil assembly of any preceding clause, wherein the first segment has a first centerline that extends through the first impingement surface.

The airfoil assembly of any preceding clause, wherein the first centerline is substantially perpendicular to the axial direction, the radial direction, or both.

The airfoil assembly of any preceding clause, wherein the cooling hole has a cooling hole centerline that extends through a center of the cooling hole and intersects with the airfoil.

The airfoil assembly of any preceding clause, wherein a distance of the first impingement surface to the one of the first slash face, the second slash face, the leading edge, or the trailing edge is equal to or between 30% and 300% of a height of the platform between the platform chamber and the upper surface.

The airfoil assembly of any preceding clause, wherein a distance of the first impingement surface to the one of the first slash face, the second slash face, the leading edge, or the trailing edge is equal to or between 70% and 170% of a height of the platform between the platform chamber and the upper surface.

The airfoil assembly of any preceding clause, wherein the second segment is disposed at an angle relative to the first segment such that fluid flowing into the first segment changes direction at the first impingement surface.

The airfoil assembly of any preceding clause, wherein the angle is equal to or between 80 degrees and 100 degrees.

The airfoil assembly of any preceding clause, wherein the first segment is spaced from at least one of the upper surface or the lower surface to a greater extent than the platform chamber.

The airfoil assembly of any preceding clause, wherein the impingement channel includes a second impingement surface and a third segment; wherein the second segment extends from the first impingement surface to the second impingement surface; and the third segment extends from the second impingement surface to the cooling hole.

The airfoil assembly of any preceding clause, further comprising a second platform and a second airfoil extending from the second platform, the second platform including a second platform first slash face and a second platform second slash face; wherein the first impingement surface is adjacent the second slash face; wherein the second platform first slash face is adjacent the second slash face; and wherein the second platform includes a set of second platform impingement channels including a set of second platform impingement surfaces disposed adjacent the second platform first slash face.

The airfoil assembly of any preceding clause, wherein the second slash face is concave and defines a recess; wherein the first impingement surface is disposed along the recess; wherein the second platform first slash face is convex and disposed at least partially in the recess; and wherein the set of second platform impingement surface are disposed at least partially in the recess.

The airfoil assembly of any preceding clause, wherein the first impingement surface and a pair of the second platform impingement surfaces of the set of second platform impingement surfaces are disposed in an alternating configuration.

The airfoil assembly of any preceding clause, wherein the second slash face is concave and defines a recess; and wherein the second platform first slash face is convex and disposed at least partially in the recess.

The airfoil assembly of any preceding clause, wherein the platform is a first platform and the impingement channel is a first impingement channel of a plurality of first impingement channels located within the first platform, the plurality of first impingement channels comprising a plurality of first impingement surfaces including the first impingement surface; and wherein the plurality of first impingement surfaces are disposed in an alternating impingement surface configuration relative to the set of second platform impingement surfaces along a length of the adjacent second slash face and second platform first slash face.

The airfoil assembly of any preceding clause, wherein the second platform includes a set of second cooling holes fluidly coupled with the set of second impingement channels.

The airfoil assembly of any preceding clause, further comprising a second airfoil and a second platform extending from the second airfoil, the second platform including a second platform first slash face and a second platform second slash face; and wherein the second platform first slash face is adjacent the second slash face of the first platform; wherein the second slash face is concave and defines a recess; and wherein the second platform first slash face is convex and disposed at least partially in the recess.

The airfoil assembly of any preceding clause, wherein a shape of the recess corresponds to a shape of the second airfoil.

The airfoil assembly of any preceding clause, wherein the cooling hole is adjacent the recess.

The airfoil assembly of any preceding clause, further comprising a plurality of cooling holes including the cooling hole; wherein the plurality of cooling holes are adjacent the recess and fluidly coupled to the upper surface or the lower surface.

The airfoil assembly of any preceding clause, wherein the second platform comprises a plurality of second cooling holes; and wherein the plurality of cooling holes are disposed in an alternating cooling hole configuration relative to the plurality of second cooling holes.

The airfoil assembly of any preceding clause, further comprising a second impingement channel located within the platform and fluidly coupled with the cooling hole.

The airfoil assembly of any preceding clause, wherein the platform is formed via additive manufacturing.

A shroud for a gas turbine engine comprising the airfoil assembly of any preceding clause.

A nozzle band for a gas turbine engine comprising the airfoil assembly of any preceding clause.

A blade for a gas turbine engine comprising the airfoil assembly of any preceding clause.

A method of forming the airfoil assembly of any preceding clause, the method comprising: forming the platform via additive manufacturing such that an inner surface of the impingement channel is continuous.

The method of any preceding clause, wherein connecting the airfoil with the platform includes forming the airfoil with the platform via additive manufacturing.

The method of any preceding clause, wherein the forming does not include drilling.

An airfoil assembly for a turbine engine, the airfoil assembly comprising: a platform having upper and lower surfaces bounded by a peripheral edge; an airfoil extending from the upper surface of the platform from a root, proximate the upper surface, to a tip, distal from the upper surface; and an internal cooling circuit comprising a supply conduit supplying cooling air to the platform, a platform chamber having a cross-sectional area greater than the supply conduit and receiving cooling air from the supply conduit, at least one impingement cooling passage extending from the platform chamber and having a first segment extending laterally from the platform chamber and a second segment extending radially from the first segment and terminating in a cooling hole opening onto one of the upper and lower surfaces, wherein the transition from the first segment to the second segment forms an impingement zone for the cooling air passing through the cooling circuit.

This written description uses examples to describe aspects of the disclosure described herein, including the best mode, and also to enable any person skilled in the art to practice aspects of the disclosure, including making and using any devices or systems and performing any incorporated methods. The patentable scope of aspects of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An airfoil assembly for a turbine engine, the airfoil assembly comprising:
- a platform including:
  - an upper surface and a lower surface that are spaced from one another in a radial direction;
  - a leading edge and a trailing edge that are spaced from one another in an axial direction; and
  - a first slash face and a second slash face that are spaced from one another in a circumferential direction;
- an airfoil extending from the platform in the radial direction, the airfoil including a root that is proximal to the platform and a tip that is distal from the platform;
- a platform chamber defined at least partially between the upper surface and the lower surface;
- an impingement channel located within the platform, the impingement channel including:
  - a first segment extending from the platform chamber toward a first impingement surface that is adjacent one of the first slash face, the second slash face, the leading edge, or the trailing edge, and
  - a second segment extending from a distal end of the first segment toward the upper surface or the lower surface; and
- a cooling hole fluidly coupling a distal end of the impingement channel with the corresponding upper surface or the corresponding lower surface toward which the second segment extends;
- wherein the impingement channel includes a second impingement surface and a third segment;
- wherein the second segment extends from the first impingement surface to the second impingement surface;
- wherein the third segment extends from the second impingement surface to the cooling hole; and
- wherein a hydraulic diameter of the third segment is larger than a hydraulic diameter of the second segment.

2. The airfoil assembly of claim 1, further comprising a second impingement channel located within the platform;

wherein the first impingement surface is adjacent the first slash face; and wherein the second impingement channel includes a second channel first impingement surface adjacent the second slash face.

3. The airfoil assembly of claim 2, further comprising a third impingement channel located within the platform; and wherein the third impingement channel includes a third channel first impingement surface adjacent the leading edge or the trailing edge.

4. The airfoil assembly of claim 1, wherein the second impingement surface is disposed at a distal end of the second segment, and wherein the second impingement surface is not parallel to the first impingement surface.

5. The airfoil assembly of claim 1, wherein the second impingement surface is disposed at a distal end of the second segment, and wherein the second impingement surface is adjacent the upper surface or the lower surface.

6. The airfoil assembly of claim 1, wherein the second impingement surface is disposed at a distal end of the second segment, and wherein the impingement channel comprises continuous inner surfaces of the platform.

7. The airfoil assembly of claim 1, wherein the second impingement surface is disposed at a distal end of the second segment, and wherein the first segment has a first centerline that extends through the first impingement surface.

8. The airfoil assembly of claim 7, wherein the first centerline is perpendicular to the axial direction, the radial direction, or both.

9. The airfoil assembly of claim 1, wherein a distance of the first impingement surface to the one of the first slash face, the second slash face, the leading edge, or the trailing edge is equal to or between 30% and 300% of a height of the platform between the platform chamber and the upper surface.

10. The airfoil assembly of claim 1, wherein the second segment is disposed at an angle relative to the first segment such that fluid flowing into the first segment changes direction at the first impingement surface.

11. The airfoil assembly of claim 10, wherein the angle is equal to or between 80 degrees and 100 degrees.

12. The airfoil assembly of claim 1, wherein the first segment is spaced farther from at least one of the upper surface or the lower surface than from the platform chamber.

13. The airfoil assembly of claim 1, further comprising a second platform and a second airfoil extending from the second platform, the second platform including a second platform first slash face and a second platform second slash face;

wherein the first impingement surface is adjacent the second slash face;

wherein the second platform first slash face is adjacent the second slash face; and wherein the second platform includes a set of second platform impingement channels including a set of second platform impingement surfaces disposed adjacent the second platform first slash face.

14. The airfoil assembly of claim 13, wherein the second slash face is concave and defines a recess;

wherein the first impingement surface is disposed along the recess;

wherein the second platform first slash face is convex and disposed at least partially in the recess; and wherein the set of second platform impingement surfaces are disposed at least partially in the recess.

15. The airfoil assembly of claim 14, wherein the first impingement surface and a pair of the second platform impingement surfaces of the set of second platform impingement surfaces are disposed in an alternating configuration.

16. The airfoil assembly of claim 13, wherein the second slash face is concave and defines a recess; and wherein the second platform first slash face is convex and disposed at least partially in the recess.

17. The airfoil assembly of claim 13, wherein the platform is a first platform and the impingement channel is a first impingement channel of a plurality of first impingement channels located within the first platform, the plurality of first impingement channels comprising a plurality of first impingement surfaces including the first impingement surface; and wherein the plurality of first impingement surfaces are disposed in an alternating impingement surface configuration relative to the set of second platform impingement surfaces along a length of the adjacent second slash face and the second platform first slash face; and wherein the second platform includes a set of second cooling holes fluidly coupled with the set of second impingement channels.

18. The airfoil assembly of claim 1, wherein a hydraulic diameter of the cooling hole is larger than the hydraulic diameter of the second segment.

* * * * *